United States Patent [19]

Morris et al.

[11] Patent Number: 4,540,675

[45] Date of Patent: Sep. 10, 1985

[54] CARBON-CONTAINING REFRACTORIES WITH SUPERIOR EROSION AND OXIDATION RESISTANCE

[75] Inventors: Martin Morris, Imperial; Mark K. Fishler, Pittsburgh, both of Pa.

[73] Assignee: Vesuvius Crucible Company, Pittsburgh, Pa.

[21] Appl. No.: 490,506

[22] Filed: May 2, 1983

[51] Int. Cl.$^3$ .................. C04B 35/54; C04B 35/56
[52] U.S. Cl. .................................. 501/99; 501/100; 501/101
[58] Field of Search ................... 501/100, 101, 99

[56] References Cited

FOREIGN PATENT DOCUMENTS 0122309  9/1979  Japan ................................. 501/100
0660964  5/1979  U.S.S.R. ........................... 501/100

Primary Examiner—James Poer
Attorney, Agent, or Firm—Reed, Smith, Shaw & McClay

[57] ABSTRACT

An elemental carbon-containing refractory composition having superior erosion and oxidation resistance due to the addition of prescribed amounts of boron carbide.

23 Claims, No Drawings

CARBON-CONTAINING REFRACTORIES WITH SUPERIOR EROSION AND OXIDATION RESISTANCE

FIELD OF THE INVENTION

The present invention relates generally to refractory compositions useful in the ferrous and non-ferrous metal industries, and more particularly, to a boron carbide additive which is useful in increasing the erosion and oxidation resistance of carbon-containing refractory compositions.

DISCUSSION OF THE TECHNICAL PROBLEM

Refractories used in contact with molten metals in both the ferrous and non-ferrous metals industries often contain two or more weight percent of elemental carbon as part of the composition. The elemental carbon can be from any available source, such as graphite, pitch or coke, and can be part of the composition, or the binder or any combination. It is known in the refractories industry that the inclusion of elemental carbon serves to protect the refractory from attack and erosion by molten metals and accompanying slags.

However, elemental carbon in the refractory composition is itself susceptible to oxidation and erosion by such molten metals and slags. Therefore, it is a known practice to add anti-oxidant materials to the refractory composition to protect the carbon. Known varieties of such anti-oxidants are commonly classified as fluxes or glass formers, and include feldspars, borax, rutile, frits, silicon, cryolite and silicon carbide.

For example, U.S. Pat. No. 4,210,264 teaches the use of silicon carbide in carbon-containing refractories. Similarly, German Pat. No. 2,724,430 teaches that the graphite and amorphous carbon of a refractory nozzle may be wholly or partially replaced with silicon carbide, zirconium di-boride or boron nitride in finely divided form.

An article entitled Graphite Containing Refractories appearing in the November 1982 edition of the *Journal of Refractories*, pages 11-15, discusses the addition of silicon to graphite-containing refractories to improve oxidation resistance, and the use of oxides or second phases as components in such refractories, to provide some measure of oxidation resistance.

The disadvantage of adding these types of impurities to the refractory is that they may form liquids or generally low viscosity phases, i.e., softened phases, in an otherwise refractory product. Therefore, the overall integrity of the refractory product is diminished by making part of it, the low viscosity phases, vulnerable to metal and slag erosion. Also, the low viscosity phase can alter or react with the other components in the refractory, thereby further degrading the product. An unfortunate compromise must be struck between adding sufficient flux-forming ingredients to protect the elemental carbon from oxidation and erosion and adding too much, resulting in an overall decreased erosion resistance and refractoriness.

SUMMARY OF THE INVENTION

The present invention provides an elemental carbon-containing refractory composition having improved erosion resistance without the use of low melting point ingredients which tend to soften at temperatures less than the ultimate temperature contemplated for use.

According to the invention, boron carbide is used as part of the refractory composition. Boron carbide has a melting point of 4442° F. (2450° C.), well above the operating temperature of furnaces in the metal producing industry. Additionally, boron carbide has been determined to be very stable in contact with other refractory components. As a result, elemental carbon-containing refractories which include boron carbide have exceptionally high resistance to oxidation and erosion in use.

The boron carbide may be added into the refractory composition either at the mixing stage or by impregnation techniques, and preferably it is added in relatively fine particulate form, e.g., with particle size less than about 200 microns and more preferably less than about 40 microns.

Further, preferably the boron carbide is added to constitute between about one percent and ten percent by weight of the entire refractory composition; and more preferably between about three percent and seven percent thereof.

DESCRIPTION OF THE PREFERRED EMBODIMENTS

In the practice of the present invention, boron carbide ($B_4C$) is added into an elemental carbon-containing refractory composition. The elemental carbon-containing refractory composition may be an all-carbon material, but more commonly it includes an elemental carbon portion and one or more non-carbon refractory filler materials.

Non-carbon refractory filler materials useful in the practice of the invention, although not limiting thereto, include alumina, silica, magnesia, zirconia, zircon, silicon carbide and alumina silicate clay, one or more being included in a given refractory composition.

The elemental carbon portion of the refractory composition may take a number of different forms and serve a number of different purposes in the formation of a refractory article. For example, the elemental carbon portion may be present in the composition as a binder material, originating from a pitch or a resin-type carbonaceous material. Additionally, the elemental carbon portion may be present as a carbon filler material, and may take the form of graphite (crystalline or amorphous), coke, carbon black or any other carbonaceous material. Of course, the elemental carbon portion may also be present as a combination of binder material and filler material. The elemental carbon portion may constitute between about two weight percent and about ninety-five weight percent of the total refractory composition.

The boron carbide useful in the present invention is generally included into the refractory composition at the mixing stage, and preferably it is added in a particulate form. Although not limiting to the invention, the boron carbide preferably has a particle size less than about 200 microns (able to pass through a −150 Mesh screen), and more preferably has a particle size less than about 40 microns (able to pass through a −325 Mesh screen). Boron carbide having an average particle size of about 10 microns has been determined to perform highly satisfactorily. Boron carbide is known to be available from The Norton Co. of Massachusetts and Boride Products, Inc. of Traverse City, Mich.

As more fully detailed below, inclusion of boron carbide into an elemental carbon-containing refractory composition improves dramatically the erosion resistance and life expectancy of a refractory article. It is believed that this result occurs because oxidation of the elemental carbon is significantly reduced in the high temperature and oxygen-rich environment in which such refractory articles are commonly used. More particularly, it is believed that, absent the practice of the present invention, the elemental carbon in the refractory composition chemically reacts with the oxygen in the surrounding atmosphere, metal and slag to form either $CO_2$ or $CO$. The carbon-containing gas then escapes from the body of the refractory article, resulting in weight loss, a loss in refractory characteristics and a loss in structural integrity in the refractory article. The refractory article begins to erode from the outer surfaces inward, and the useful life of the article is substantially limited by such erosion, particularly where the elemental carbon is serving as a binder material.

In the practice of the present invention, it is believed that the oxidation of the elemental carbon is significantly retarded by the inclusion of boron carbide. Although not fully understood, it is believed that the boron carbide protects the elemental carbon from oxidation through two related mechanisms; first, the boron carbide itself has a high affinity for oxygen, reacting therewith according to the following chemical equation:

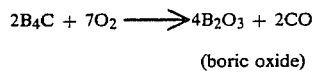

$$2B_4C + 7O_2 \longrightarrow 4B_2O_3 + 2CO$$
(boric oxide)

This initial reaction of the boron carbide uses up oxygen which otherwise would oxidize the elemental carbon.

The second mechanism by which the boron carbide is believed to reduce the oxidation of the elemental carbon is through the formation of a glassy "shield" adjacent the outer surface of the refractory article, the glassy shield apparently being created by the cooperation of the boric oxide formed in the initial boron carbide reaction with the remainder of the refractory composition. As will be appreciated more fully from the examples which follow, the shield apparently forms a barrier to the passage of oxygen to elemental carbon molecules further within the body of the refractory article. In this manner, a relatively thin surface layer of the refractory article oxidizes and erodes, as in the past, but thereafter further oxidation and erosion is substantially impeded. Such a result was particularly surprising because earlier experiments with boric oxide as an initial ingredient in the refractory composition failed to yield similar anti-oxidant and anti-erosion results.

An additional advantage of the inclusion of boron carbide into elemental carbon-containing refractory material is the fact that the boron carbide has a very high melting point and does not change into a low-viscosity phase within the body of the refractory article when it is subjected to normal operating temperatures. Moreover, the boron carbide has been determined to be highly stable in the presence of the other materials commonly included in refractory compositions, such that integrity-degrading chemical reactions are not a problem.

Although not limiting to the invention, a refractory composition is commonly formed by mixing the desired constituent ingredients in the presence of an appropriate amount of moisture to generate a homogenous mass. The refractory mass may then be pressed into a desired configuration, and, if desired, fired at elevated temperatures, e.g., greater than 1292° F. (700° C.), under preselected atmospheric conditions, e.g., a reducing atmosphere, to provide structural integrity to the configuration. Alternatively, the refractory mass may be chemically bonded, such that elevated temperatures are first encountered in use. Through these and other known production processes, a large variety of highly useful refractory articles may be formed. For example, refractory shrouds, nozzles, plates, crucibles, stopper heads, pressure casting tubes, and bricks may be formed for the metals industry. Additionally, the present invention may be practiced to provide other items such as electric arc furnace electrodes, carbon welding rods, graphite resistance heating elements, and heat shield tiles for aerospace applications.

The boron carbide may be incorporated within the refractory material at the mixing stage prior to formation of a refractory shape. Alternatively, the boron carbide may be included into the refractory material after the formation of the refractory shape, by impregnation techniques. In the latter process, a quantity of boron carbide in particulate form may be urged into the open pores of a refractory article, e.g., by employing an appropriate carrier fluid and utilizing pressure and/or vacuum to force the boron carbide-bearing carrier fluid through the pores of the refractory article. Of course, the particle size of the boron carbide should be somewhat less than the pore size of refractory article. By selecting appropriate pressure, particle size, carrier fluid and time of application, the boron carbide can be incorporated throughout the body of the refractory article, or alternatively, it may be incorporated only into surface portions to a desired depth.

Due to the formation of the protective shield by the boron carbide adjacent the exposed surfaces of the refractory material, it is available and advantageous to employ the boron carbide containing compositions of the present invention as protective surface layers over all or selective portions of otherwise erosion-prone refractory articles. In this way, substantial raw material cost savings may be realizable. This may be achieved by either impregnating only selected portions of an already-formed refractory article, or alternatively, by mixing boron carbide into only selected portions of the refractory material used to form the refractory article.

EXAMPLE I

Laboratory testing was performed to evaluate the erosion resistance and oxidation resistance characteristics of elemental carbon-containing refractory compositions produced according to the present invention. Three different alumina-graphite compositions, identified as Mix A, B and C in Tables I and II, were prepared in a conventional manner. Mix A was prepared as representative of compositions which do not include boron carbide. Rather, Mix A was prepared with a quantity of anti-oxidants which are conventionally used with elemental carbon-containing refractories to improve erosion and oxidation characteristics.

Mixes B and C were prepared according to the present invention with differing quantities of boron carbide to illustrate how erosion and oxidation characteristics vary with the quantity of boron carbide included. The boron carbide was selected from a 98% pure supply source and was sized to pass through a $-325$ Mesh screen.

TABLE 1

| Mix Designation: | A | B | C |
|---|---|---|---|
| Composition: | | | |
| Carbon | 30% | 30% | 30% |
| Alumina | 50% | 65.5% | 63% |
| Conventonal Anti-Oxidants | 20% | 2% | 2% |
| Boron Carbide Additive | — | 2.5% | 5.0% |
| | 100% | 100% | 100% |
| % Boron Carbide Additive: | 0 | 2.5 | 5.0 |
| % Boron Carbide ($B_4C$): | | 2.45 | 4.9 |

The conventional anti-oxidants included within Mix B and C consisted of silica which entered the composition as impurities in some of the raw materials.

Test samples were prepared from each mix by hydraulically pressing 1 inch×1 inch×4 inch bars and firing them under reducing conditions to form a good bond.

Laboratory erosion and oxidation tests were run on Mix A, B and C, as indicated in Table II below. The test consisted of subjecting the specimens to temperatures of 1800° F. for 16 hours in air and comparing the percent weight loss and depth of oxidation for each.

The 1800° F. temperature was selected as representative of common pre-heat temperatures in the metals industry. Depth of oxidation was measured by sectioning the specimen bars and measuring (by reference to an obvious color change in the material) the depth to which the refractory material had oxidized.

TABLE II

| Erosion and Oxidation Test Results | | | |
|---|---|---|---|
| Mix Designation: | A | B | C |
| % Weight Loss: | 25.4 | 17.1% | 11.7% |
| Depth of Oxidation, as a percent of cross-section: | 100% | 25% | 2% |

The results in Table II clearly indicate that the addition of boron carbide according to the present invention substantially improves the erosion and oxidation resistance of the alumina-graphite refractory material used in Example I. The results also indicate that the 4.9% boron carbide composition of Mix C was decidedly superior to the 2.45% boron carbide composition of Mix B, thus indicating that the improvements realized are related to the amount of boron carbide utilized.

EXAMPLE II

Because high purity (98% pure) boron carbide is presently a relatively expensive material, a lower purity and lower cost boron carbide sample was also evaluated. Table III shows the erosion and oxidation test results for a sample designated Mix D. Mix D was prepared with the same components as Mix C, except that a 90% pure boron carbide sample was utilized.

TABLE III

| Use of Lower Purity Boron Carbide Sample | |
|---|---|
| Mix Designation: | D |
| % Weight Loss | 15% |
| Depth of Oxidation | 10% |
| Boron Carbide Additive | 5% |
| Boron Carbide ($B_4C$): | 4.5% |

The results in Table III indicate that use of the 90% pure boron carbide sample also provides substantial benefits in improving the erosion and oxidation resistance characteristics of the elemental carbon-containing refractory material. By comparison to Table II, the results of Table III clearly indicate that the weight percent of boron carbide ($B_4C$) is directly related to the benefits realized.

EXAMPLE III

By way of another example, Table IV illustrates that boron carbide is an effective anti-erosion and anti-oxidizing agent in a different type of elemental carbon-containing refractory; namely, a zirconia-graphite composition. Listed in Table IV as Mix E is a zirconia-graphite composition having conventional anti-oxidants included therein. Listed as Mix F is a composition according to the present invention, wherein boron carbide from a 90% pure sample is included. The particle size of the boron carbide was the same as that used in Examples I and II.

TABLE IV

| Mix Designation: | E | F |
|---|---|---|
| Composition: | | |
| Carbon | 22% | 22% |
| Zirconia | 72.5% | 72% |
| Conventional Anti-Oxidants | 5.5% | 1% |
| Boron Carbide | — | 5% |
| | 100% | 100% |
| Percent Boron Carbide Additive | 0 | 5.0 |
| Percent Boron Carbide ($B_4C$) | 0 | 4.5 |

The conventional anti-oxidants included with Mix F consisted of silica which entered the composition as impurities in some of the raw materials.

Both Mix E and Mix F were formed into solid refractory bars and subjected to laboratory testing conditions, as described in Example I.

Results of the 1800° F., 16-hour oxidation test, as listed in Table V below, again demonstrate the beneficial effect of the boron carbide as an anti-erosion and anti-oxidizing agent.

TABLE V

| Mix Designation | E | F |
|---|---|---|
| Percent Weight Loss | 16.7% | 2.1% |
| Depth of Oxidation | 100% | 5% |

It is informative to compare the results of Tables III and V. The same weight percent of boron carbide yielded results in Example III which were superior to those in Example II, suggesting that as the elemental carbon content of the refractory material decreases, so does the optimum amount of boron carbide. However, indications suggest that the benefits of boron carbide level off as the weight percent thereof exceeds 10 percent, independent of the elemental carbon content of the refractory material.

EXAMPLE IV

An elemental carbon-containing submerged entry nozzle used in the protection of a stream of molten metal from tundish to continuous casting machine was fabricated according to the present invention using boron carbide in the nozzle. The boron carbide was included only in the slagline area of the submerged nozzle rather than throughout the entire body of the nozzle. In operation, molten metal on a continuous casting machine is protected by a layer of liquid glassy oxides (slag) to prevent oxidation of the metal and to lubricate the mold-metal interface as the casting proceeds. The submerged nozzle extends through this liquid slag to deliver the molten metal below the slag layer to prevent oxidation of the metal stream.

The slag layer is the region where the submerged nozzle is exposed to maximum erosion and oxidation. This is due both to the high oxygen content of the liquid oxide slag layer, and because the high temperature of the nozzle just above the slag layer promotes oxidation from air.

Submerged entry nozzles of Example IV were fabricated of an alumina-graphite composition similar to Mix A of Example I. In addition, the nozzles had a sleeve formed of a zirconia-graphite composition similar to that of Mix F, but with a higher zirconia content and a lower carbon content positioned at the slag level of the nozzle. One set of prior art nozzles were formed with their zirconia-graphite sleeves enriched in a conventional manner with glass forming frit to reduce oxidation and erosion.

A second set of nozzles formed according to the present invention were provided with zirconia-graphite sleeves enriched with 5% boron carbide to reduce oxidation and erosion.

Under actual casting conditions, the prior art submerged entry nozzles had a casting life of 2½–3 ladles (200 metric tons) of molten steel before the nozzles eroded through at the slagline. Nozzles according to the present invention with the boron carbide addition to the zirconia-graphite sleeve successfully cast 4 ladles. At the termination of the cast, sufficient wall thickness remained in the nozzles of the present invention for an additional ladle of casting.

Having thus described the invention in sufficient detail to enable those skilled in the art to practice it, what is desired to have protected by Letters of Patent is set forth in the following claims.

What is claimed is:

1. A refractory body for controlling the flow of a molten steel stream having a temperature greater than 1400° C. during continuous casting, said refractory body formed of the composition comprising:
    a refractory material selected from the group consisting of alumina, silica, magnesia, zirconia, zircon and silicon carbide;
    elemental crystalline carbon; and
    an effective amount of boron carbide to reduce the oxidation rate of said elemental crystalline carbon when said refractory body is subjected to said temperature greater than 1400° C.

2. The refractory body as set forth in claim 1, wherein said elemental crystalline carbon constitutes between about 2 weight percent and about 95 percent of said refractory body, and wherein said boron carbide constitutes between about 1 weight percent and about 10 weight percent of said refractory body.

3. The refractory body as set forth in claim 2, wherein said boron carbide constitutes between about 3 weight percent and about 7 weight percent of said refractory body.

4. The refractory body as set forth in claim 1, wherein said boron carbide is included into said refractory body in particulate form.

5. The refractory body as set forth in claim 4, wherein the particle size of said particulate form is less than about 200 microns.

6. The refractory body as set forth in claim 4, wherein the particle size of said particulate form is less than about 40 microns.

7. The refractory body as set forth in claim 4, wherein the particle size of said particulate form is less than about 10 microns.

8. The refractory body as set forth in claim 1, wherein said elemental crystalline carbon comprises less than about 35 weight percent, wherein said refractory material comprises greater than about 60 weight percent of alumina, and wherein said boron carbide comprises about 5 weight percent of said refractory body.

9. The refractory body as set forth in claim 1, wherein said elemental crystalline carbon comprises less than about 25 weight percent, wherein said refractory material comprises greater than about 70 weight percent of zirconia, and wherein said boron carbide comprises about 5 weight percent of said refractory body.

10. A method of improving the oxidation resistance at temperatures greater than 1400° C. of a refractory composition containing elemental crystalline carbon and a refractory material selected from the group consisting of alumina, silica, magnesia, zirconia, zircon and silicon carbide, comprising the steps of:
    adding an effective amount of boron carbide to the refractory composition; and
    subjecting said refractory composition to a temperature in excess of 1000° F. after practicing said adding step.

11. The method as set forth in claim 10, wherein said subjecting step is practiced during the formation of a refractory article from said refractory material.

12. The method as set forth in claim 10, wherein said subjecting step is practiced during use of said refractory material.

13. The method as set forth in claim 10, wherein said adding step comprises the step of:
    impregnating said boron carbide into the body of a refractory article formed of said refractory composition.

14. The method as set forth in claim 13, wherein said impregnating step is practiced on only a selected portion of said refractory article.

15. The method as set forth in claim 14, wherein said selected portion is a surface portion.

16. A refractory article formed of a refractory composition, said refractory composition comprising:
    a refractory material selected from the group consisting of alumina, silica, magnesia, zirconia, zircon and silicon carbide;
    elemental crystalline carbon; and
    an effective amount of boron carbide to reduce the oxidation rate of said elemental crystalline carbon when said refractory composition is subjected to temperatures greater than 1400° C.

17. The refractory article as set forth in claim 16, wherein said refractory article is a refractory shroud for use in the steel industry.

18. The refractory article as set forth in claim 16, wherein said refractory article is a refractory nozzle for use in the steel industry.

19. The refractory article as set forth in claim 16, wherein said refractory article is a refractory closure plate for use in the steel industry.

20. The refractory article as set forth in claim 16, wherein said refractory article is a refractory crucible for use in the steel industry.

21. The refractory article as set forth in claim 16, wherein said refractory article is a refractory stopper head for use in the steel industry.

22. The refractory article as set forth in claim 16, wherein said refractory article is a refractory casting tube for use in the steel industry.

23. The refractory article as set forth in claim 16, wherein said refractory article is a refractory brick for use in the steel industry.

* * * * *

UNITED STATES PATENT AND TRADEMARK OFFICE
CERTIFICATE OF CORRECTION

PATENT NO. : 4,540,675
DATED : September 10, 1985
INVENTOR(S) : Martin Morris and Mark K. Fishler It is certified that error appears in the above-identified patent and that said Letters Patent are hereby corrected as shown below:

column 5, the Table I should appear as follows:

Mix Designation:

| Composition: | A | B | C |
|---|---|---|---|
| Carbon | 30% | 30% | 30% |
| Alumina | 50% | 65.5% | 63% |
| Conventional Anti-Oxidants | 20% | 2% | 2% |
| Boron Carbide Additive | - | 2.5% | 5.0% |
| | 100% | 100% | 100% |
| %Boron Carbide Additive: | 0 | 2.5 | 5.0 |
| %Boron Carbide ($B_4C$): | | 2.45 | 4.9 |

UNITED STATES PATENT AND TRADEMARK OFFICE
CERTIFICATE OF CORRECTION

PATENT NO. : 4,540,675

DATED : September 10, 1985

INVENTOR(S) : Martin Morris and Mark K. Fishler

It is certified that error appears in the above-identified patent and that said Letters Patent is hereby corrected as shown below:

Column 6, line 67, the partial sentence should read -- In operation, molten metal in a continuous --.

Signed and Sealed this

Nineteenth Day of November 1985

[SEAL]

Attest:

DONALD J. QUIGG

Attesting Officer

Commissioner of Patents and Trademarks